United States Patent [19]
Hettinga

[11] Patent Number: 5,618,487
[45] Date of Patent: Apr. 8, 1997

[54] MULTI-CLAMP MOLD AND METHOD FOR CLAMPING AN INJECTION MOLD ASSEMBLY

[76] Inventor: Siebolt Hettinga, 2123 NW. 111th St., Des Moines, Iowa 50325

[21] Appl. No.: 391,552

[22] Filed: Feb. 21, 1995

[51] Int. Cl.⁶ ................................................ B29C 45/64
[52] U.S. Cl. .................... 264/328.1; 425/595; 425/451.9
[58] Field of Search .................. 264/328.1; 425/589, 425/595, 450.1, 451.9

[56] References Cited

U.S. PATENT DOCUMENTS

| | | |
|---|---|---|
| 3,528,134 | 9/1970 | Fischbach ................................ 425/595 |
| 4,874,309 | 10/1989 | Kushibe et al. ......................... 425/595 |
| 5,192,557 | 3/1993 | Hirata et al. ............................ 425/595 |

*Primary Examiner*—Jill L. Heitbrink
*Attorney, Agent, or Firm*—Brian J. Laurenzo; Kent A. Herink

[57] ABSTRACT

An apparatus and method for clamping a plastic injection mold. A first mold section is provided with a plurality of leader pins which protrude through apertures in a second mold section when the mold sections are brought into mating engagement to form a mold cavity. The second mold section is provided with cylindrical hydraulic cylinders having longitudinal passageways sufficient to accommodate the leader pins. Each hydraulic cylinder is provided with a locking assembly capable of engaging grooves provided in the ends of the leader pins. Once the leader pins have been moved through the second mold section and hydraulic cylinders the locking mechanisms engage the leader pins to allow the hydraulic cylinders to push against the locking mechanisms in an effort to clamp the mold sections together. By using a plurality of strategically placed leader pins and clamping assemblies, large clamping systems can be eliminated and more precise clamping pressures can be applied to the mold sections. Since large prior art clamping systems can be eliminated, the size and weight of the present invention clamping system is substantially decreased.

4 Claims, 5 Drawing Sheets

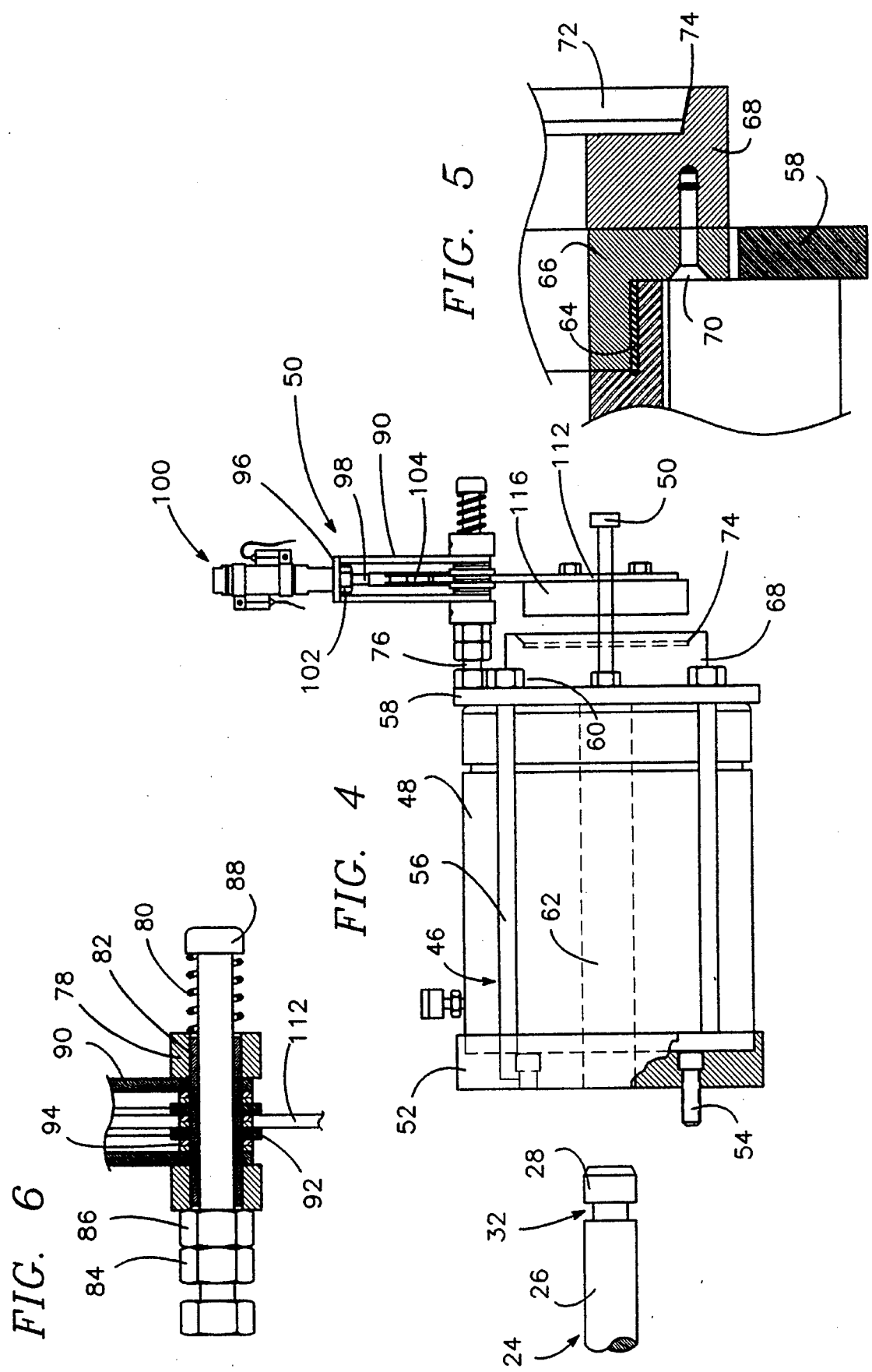

5,618,487

MULTI-CLAMP MOLD AND METHOD FOR CLAMPING AN INJECTION MOLD ASSEMBLY

BACKGROUND OF THE INVENTION

This invention relates to a clamping apparatus and a method for clamping together the mold sections of an injection mold unit to form a sealed mold cavity and, more particularly, to a clamping apparatus and method for clamping an injection mold unit which is self-contained, uses only a small amount of energy, is compact in size, and is less expensive than standard mold clamps to purchase and operate.

Injection molding machines generally include a two-section mold unit wherein one of the mold sections is stationary and the other mold section generally is movable between an open position away from the stationary mold section and a closed position wherein the two mold sections are sealed in contact engagement to form a mold cavity. The stationary mold section generally includes an opening for the injection of a mold material into the mold cavity. When the mold material is injected under high pressure into the mold cavity, the mold sections must be in positive sealed engagement to prevent the escape of mold material from the mold cavity. This sealed engagement is usually accomplished by clamping the mold sections together after the sections have been brought into engagement.

Clamping is typically accomplished with the use of very high pressure clamps which are secured to a mold frame. The mold frame generally has a set of tie bars interconnecting a pair of pressure plates. One pressure plate is typically fixed and nonmovable while the other pressure plate slides back and forth along the tie bars to allow the pressure plates to move into and out of proximity with one another. A high pressure clamp is braced against the mold frame on one end and secured to the movable pressure plate on the other. The entire assembly is designed to produce extreme amounts of pressure, between the movable pressure plate and the stationary pressure plate, with the high pressure clamp. The clamping assembly is typically of a general construction to allow various types of mold units to be placed within the clamping assembly. Before a mold unit can be placed between the pressure plates of a clamping assembly, a housing must be provided to allow the pressure plates to evenly contact the halves of the mold unit and to prevent uneven pressure being applied to the halves of the mold unit. Additionally, the mold unit typically requires an ejector assembly to remove the part after the molding process has been completed and a runner assembly to properly inject the plastic material into the mold cavity. These assemblies must also be provided with specially designed housings to allow them to fit properly between the mold units and the pressure plates and to allow these assemblies to withstand the extreme pressures generated during the molding process.

The requirement for the specially designed assemblies and housings leads to increased costs and added weight to the clamping apparatus. Although many such assemblies and housings are of a standard variety and, therefore, available without the added cost of customized tooling, very large or complicated parts typically require specialized housings, runners, and ejection assemblies, the manufacturing of which is time and capital intensive. Furthermore, since these specialized assemblies are generally integrated with the mold unit, failure of these assemblies leads to significant downtime. Not only must the failed assembly be replaced, but a new assembly must be integrated with the mold unit. Because withdrawing the failed assembly and integrating a new assembly can often not be done "in-house," a failed assembly can often take a mold unit out of service for several weeks.

The high pressure under which typical molding machines operate, coupled with the added weight of specialized housings requires a very large, very powerful clamping device to properly secure the mold units together. Additionally, due to the high pressure associated with such molding operations, the tie bars of the mold frame must be very strong, which also makes them unavoidably heavy. The cost of the parts associated with the clamping operation also increases with the weight and durability requirements of the parts. Therefore, typical molding machines are expensive as well as heavy.

The specialized housings for the mold unit, the runner assembly, and the ejection assembly also require an increased amount of daylight between the two pressure plates. This increased daylight requires that the clamping assembly be long to allow the mold units to retract enough from one another to allow the finished plastic article to be removed from the mold cavity. The added weight associated with this lengthening of the clamping assembly increases the overall weight of the apparatus.

Very large parts, such as bath tubs and freezer liners, require very large mold sections. Often, the size and expense of the clamping equipment required to maintain such large mold sections together throughout the molding process makes injection molding impractical for these applications. It would therefore be desirable to provide a feasible process for injection molding large parts.

The difficulties encountered in the prior art discussed hereinabove are substantially eliminated by the present invention.

SUMMARY OF THE INVENTION

Accordingly, it is an object of the present invention is to provide an apparatus for clamping the mold unit of an injection mold assembly which can apply localized clamping forces at different pressures.

Another object of the present invention is to provide an apparatus for clamping the mold unit of an injection mold assembly wherein very large plastic articles may be produced at a competitive cost.

A further object of the present invention to provide a method for clamping the mold unit of an injection mold assembly wherein the need for large clamps is eliminated.

Still another object of the present invention is to provide a method for clamping the mold unit of an injection mold assembly wherein the clamping means are compact and self-contained, making the injection mold assembly easy to move and store.

It is yet another object of the present invention to provide a clamping apparatus for performing the method described herein.

These and other objects of the invention will become apparent upon reference to the following specification, drawings, and claims.

The present invention is proposed to overcome the difficulties encountered heretofore. To this end, a first mold section and a second mold section are provided in mating alignment with one another. The second mold section forms a mold cavity with the first mold section when moved into mating engagement with the first mold section. A leader pin is secured to the first mold section and passes through an aperture formed in the second mold section. Means are provided for operably locking the leader pin against passage out of the aperture. Means are also provided for pushing the locking means away from the second mold section.

Preferably, several leader pins are secured to the first mold section and pass through the second mold section. The pushing means are hydraulic cylinders provided with a cylindrical passageways to accommodate the leader pins. The leader pins are provided with grooves engaged by pneumatically-actuated locking members. The locking members are designed to fit within a recess in the hydraulic cylinder which retains the locking members and which prevents the locking members from becoming inadvertently dislodged during the molding process.

BRIEF DESCRIPTION OF THE DRAWINGS

FIG. 4 is a side elevation showing a leader pin of the molding machine of FIG. 1 being inserted into an aperture of a hydraulic cylinder;

FIG. 5 is an enlarged side elevation in cross-section showing the saddle of the hydraulic cylinder of the clamping assembly of FIG. 4 secured to a push plate with a screw;

FIG. 6 is an enlarged side elevation in partial cross-section of the clamping assembly of FIG. 4 showing a centering device which holds pneumatically-actuated plates in proper alignment with the leader pin.

DETAILED DESCRIPTION OF THE INVENTION

Figure 1:
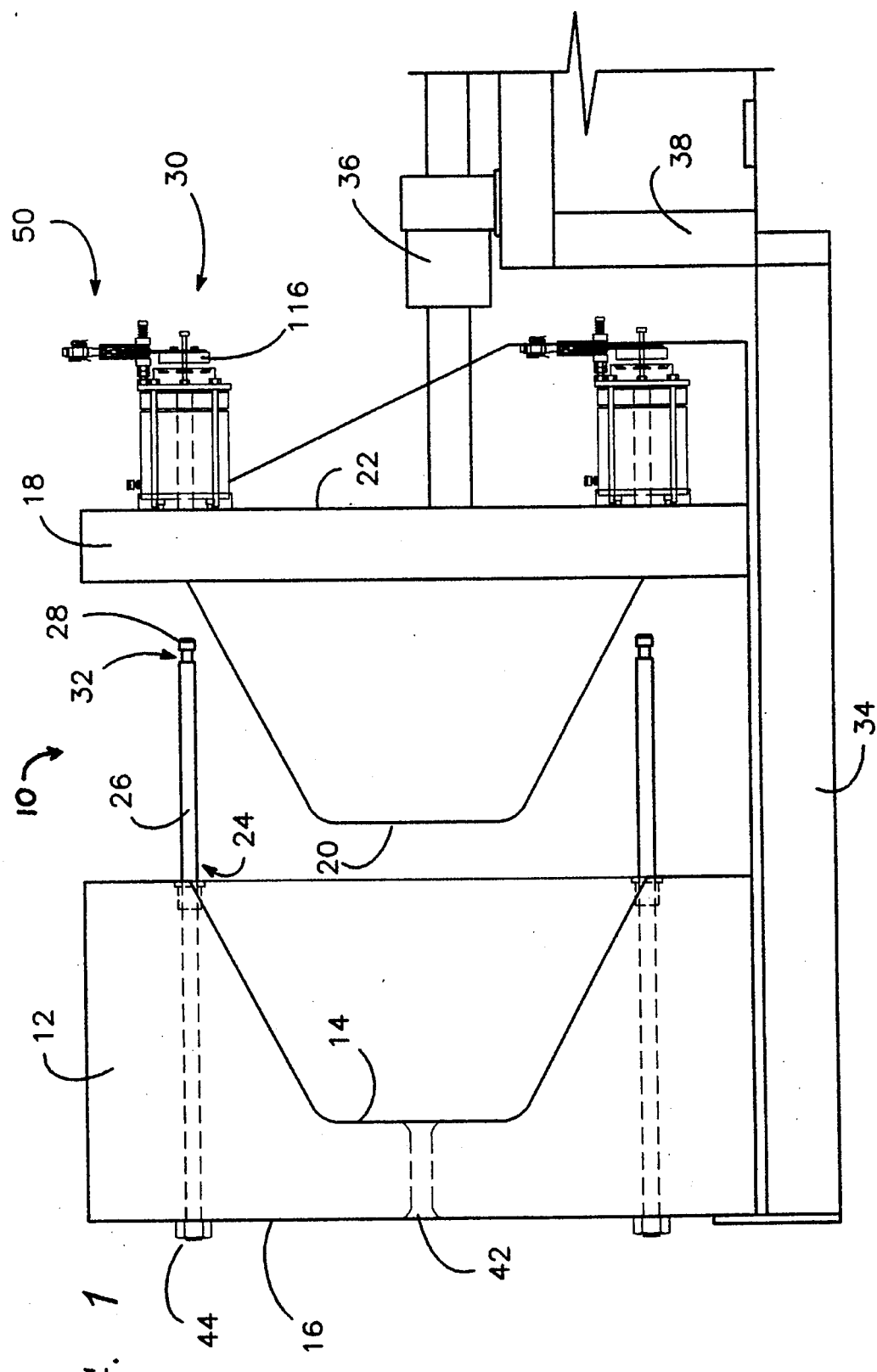
FIG. 1 is a side elevation in partial phantom showing the plastic injection molding machine of the present invention in an open position.

In the figures, there is shown a plastic injection assembly 10 having a first mold section 12 and a second mold section 18 in operable alignment with one another. The second mold section 18 is pushed into mating engagement with the first mold section 12 by clamping assemblies 30 located on the second mold section 18. The first mold section 12 is provided with several leader pins 24 which pass through the second mold section 18 and the clamping assemblies 30. Arcuate locking members 116 engage the leader pins 24 and the clamping assemblies push the second mold section 18 into engagement with the first mold section 12 by bracing against the arcuate locking members 116. After a plastic material has been injected between the clamped mold sections 12 and 18, the clamping assemblies 30 release the leader pins 24, whereafter the first mold section 12 and second mold section 18 are separated. The mold sections 12 and 18 are moved apart a sufficient distance so that a finished molded article may be removed from the plastic injection assembly 10.

As shown in FIG. 1, the first mold section 12 is provided with a face 14 and a back 16. The second mold section 18 is also provided with a face 20 and a back 22. The two mold sections 12 and 18 are positioned on a slide track 34 which allows the second mold section 18 to slide into and out of sealed engagement with the first mold section 12. While in the preferred embodiment of the present invention the first mold section 12 is secured to the slide track 34, it should be noted that such securement is not required. In the present invention, the clamping force is developed by securing arcuate locking members 116 into engagement with grooves 32 provided on leader pins 24 and pushing the second mold section 18 away from the arcuate locking members 116 and into engagement with the first mold section 12. Since the clamping force is not developed by bracing a clamp against the slide track 34 or other external bracing, but instead by pushing the second mold section 18 into engagement with the first mold section 12, both mold sections 12 and 18 may even be slidably coupled to the slide track 34.

Figure 2:
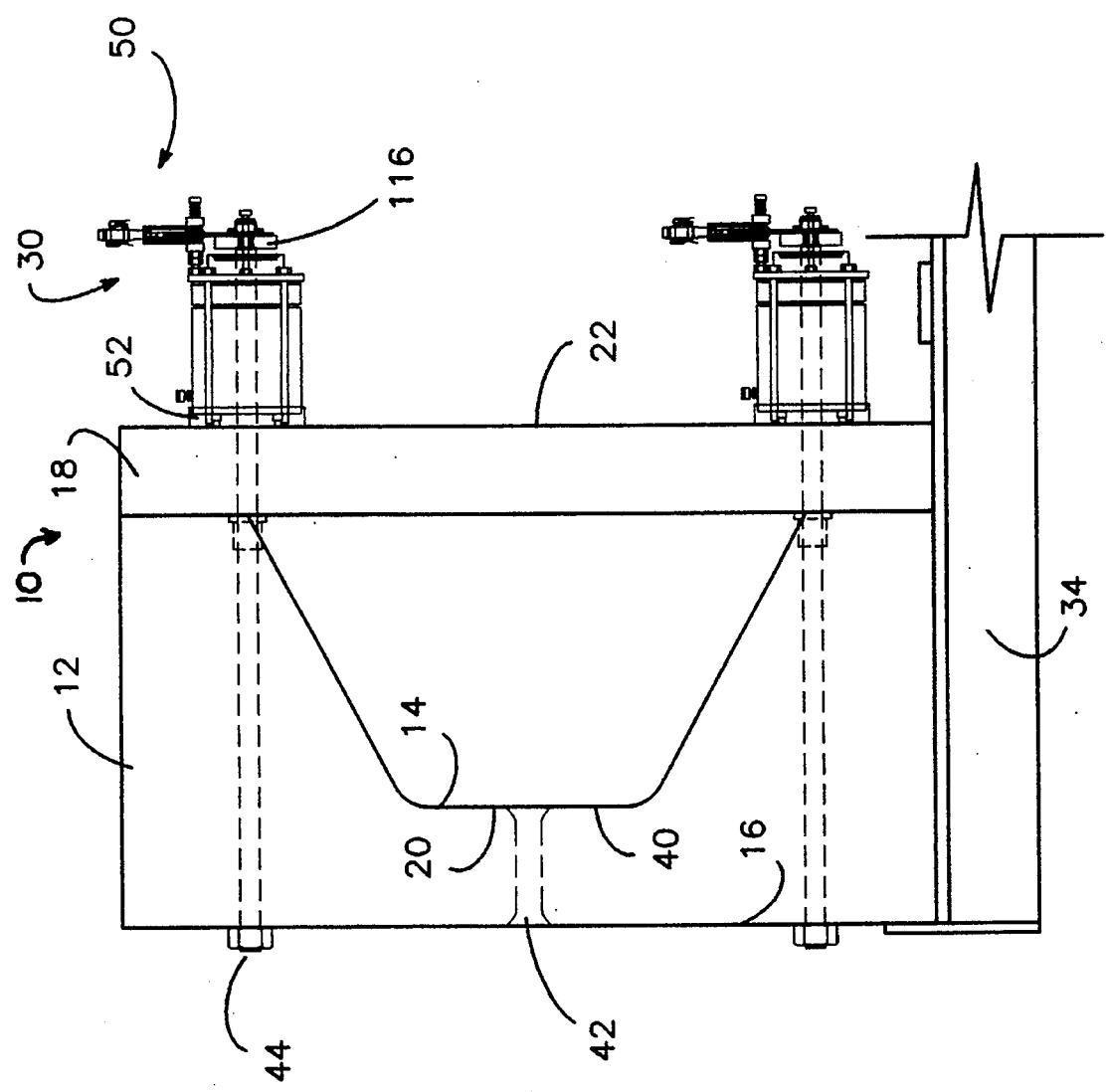
FIG. 2 is a cross-sectional side elevation in partial phantom showing the plastic injection molding machine of FIG. 1 in a closed position.

The plastic injection assembly 10 is provided with a long stroke low power hydraulic cylinder 36 secured on one end to a stationary frame 38, and on the other end to the second mold section 18. As shown in FIG. 2, when the second mold section 18 is moved into sealed engagement with the first mold section 12, a mold cavity 40 is formed between the face 14 of the first mold section 12 and the face 20 of the second mold section 18. The first mold section 12 is provided with a sprue 42 which runs from the back 16 of the first mold section 12 to the face 14 of the first mold section 12 where the sprue 42 opens into the mold cavity 40. The sprue 42 allows a plastic injection material to be injected into the mold cavity 40.

Although not shown in the drawings, it should be noted that runner and ejection assemblies may be bolted on to the back 16 of the first mold section 12 and the back 22 of the second mold section 18. By bolting these assemblies to the backs 16 and 22 of the mold sections 12 and 18, the need for bulky housings is eliminated. Since the assemblies are not subjected to clamping pressures on the backs 16 and 22 of the mold sections 12 and 18, no housings are needed to reinforce or align the assemblies. Additionally, since the assemblies can simply be bolted on, little downtime is required to replace the assemblies. The defective assemblies are simply unbolted and new assemblies are bolted on in their place.

Figure 3:
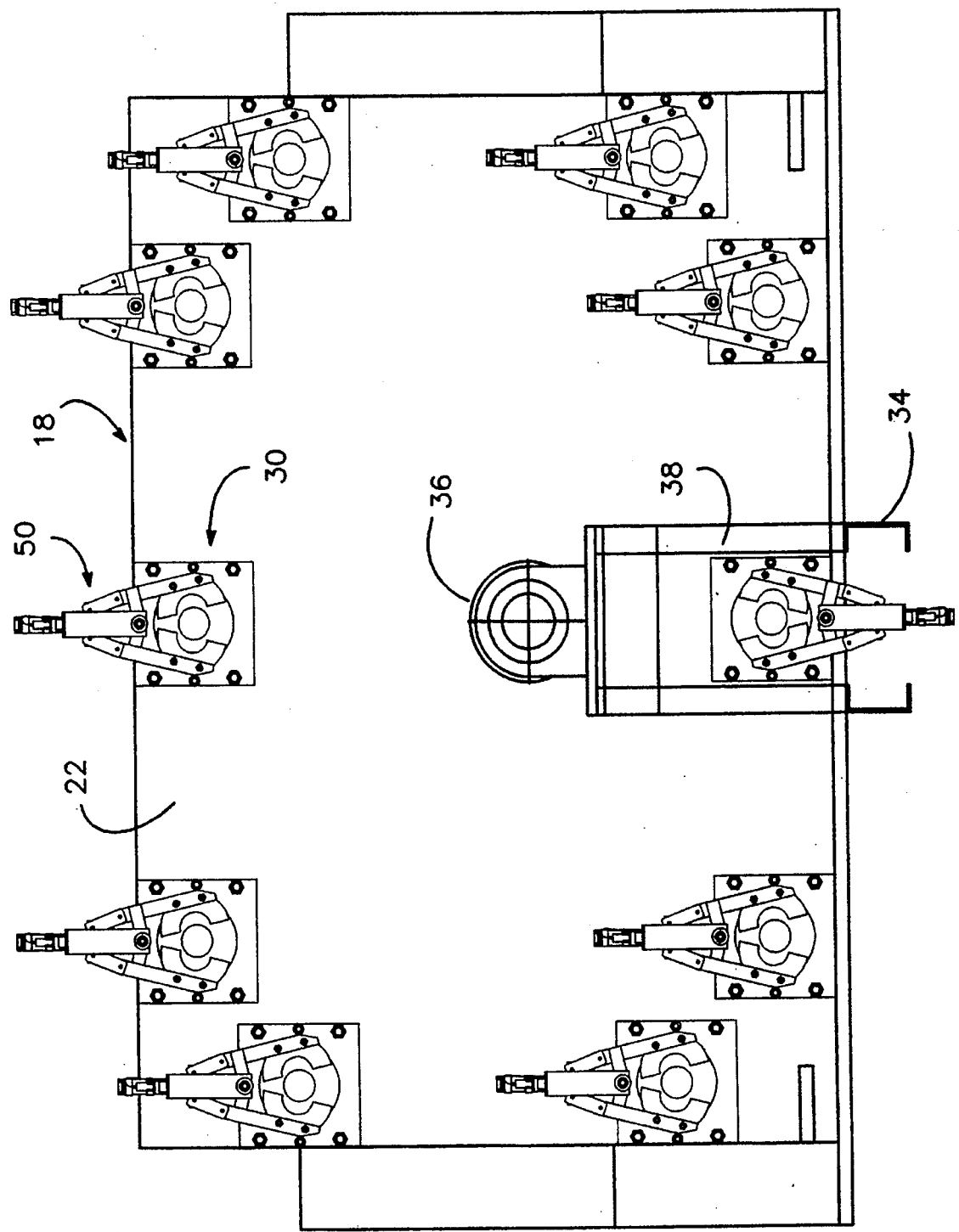
FIG. 3 is a rear elevation showing the molding machine of FIG. 1 provided with a plurality of hydraulic clamps.

The first mold section 12 is provided with a plurality of leader pins 24 which pass from the back 16 of the first mold section 12 through the face 14 of the first mold section 12 (FIG. 1). The leader pins 24 are secured to the back 16 of the first mold section 12 with a plurality of nuts 44 which screw on to threaded ends of the leader pins 24. As shown in FIG. 1, the leader pins 24 are provided with a shaft 26 and a head 28. Between the shaft 26 and the head 28 is a groove 32 which allows the leader pins 24 to be engaged by the clamping assemblies 30 secured to the back 22 of the second mold section 18 (FIGS. 1 and 3). As shown in FIG. 3, the clamping assemblies 30 are provided around the perimeter of the back 22 of the second mold section 18 so that none of the leader pins 24 pass through the mold cavity 40 (FIGS. 2 and 3).

As the clamping assemblies 30 are of a substantially similar construction, description will be limited to the single clamping assembly 30 shown in FIG. 4. The clamping assembly 30 has a frame 46, a hydraulic cylinder 48 and a leader pin locking assembly 50. The frame 46 is constructed of a collar 52 secured to the back 22 of the second mold section 18 with screws 54 or similar securement means (FIGS. 2 and 4). The frame 46 is also provided with tie rods 56 securing the collar 52 to a cylinder plate 58. The tie rods 56 are secured to the cylinder plate 58 by nuts 60 which are screwed onto a threaded end of the tie rods 56. Provided within the frame 46 is the hydraulic cylinder 48 (FIG. 4). The hydraulic cylinder 48 is provided with a passageway 62 having a sufficient diameter to allow the shaft 26 of the leader pin 24 to pass through the hydraulic cylinder 48.

As shown in FIG. 5, the hydraulic cylinder 48 has a threaded end 64 into which is screwed an annular saddle 66. In the preferred embodiment, the saddle 66 is provided with four threaded holes which match up with four threaded holes provided in an annular push plate 68. The push plate 68 is provided with a cylindrical recess 72 having a retaining wall 74 and is preferably constructed of heat-treated cold rolled steel to increase its durability. The holes in the push plate 68 are lined up with the holes in the saddle 66, and the two pieces are secured to one another by four push plate retaining screws 70. The annular saddle 66 is then screwed into the threaded end of the hydraulic cylinder 48.

The leader pin locking assembly 50 is secured to the cylinder plate 58 by a jaw mounting pin 76 (FIG. 4). The jaw mounting pin 76 is screwed into the cylinder plate 58 a sufficient distance to anchor the jaw mounting pin 76 on the cylinder plate 58. As shown in FIG. 6, provided around the jaw mounting pin 76 are a compression spring 80, a shaft collar 82, and a pair of lock nuts 84 and 86. The compression spring 80 is maintained around the jaw mounting pin 76 by a head 88 provided on the jaw mounting pin 76. Secured to the shaft collar 82 are a pair of cylinder brackets 90 and a pair of shoulder brackets 92 separated by washers 94. End sleeves 78 are secured to the ends of the shaft collar 82 with set screws to maintain the cylinder brackets 90, the shoulder brackets 92, and the washers 94 on the shaft collar 82.

Figure 7:
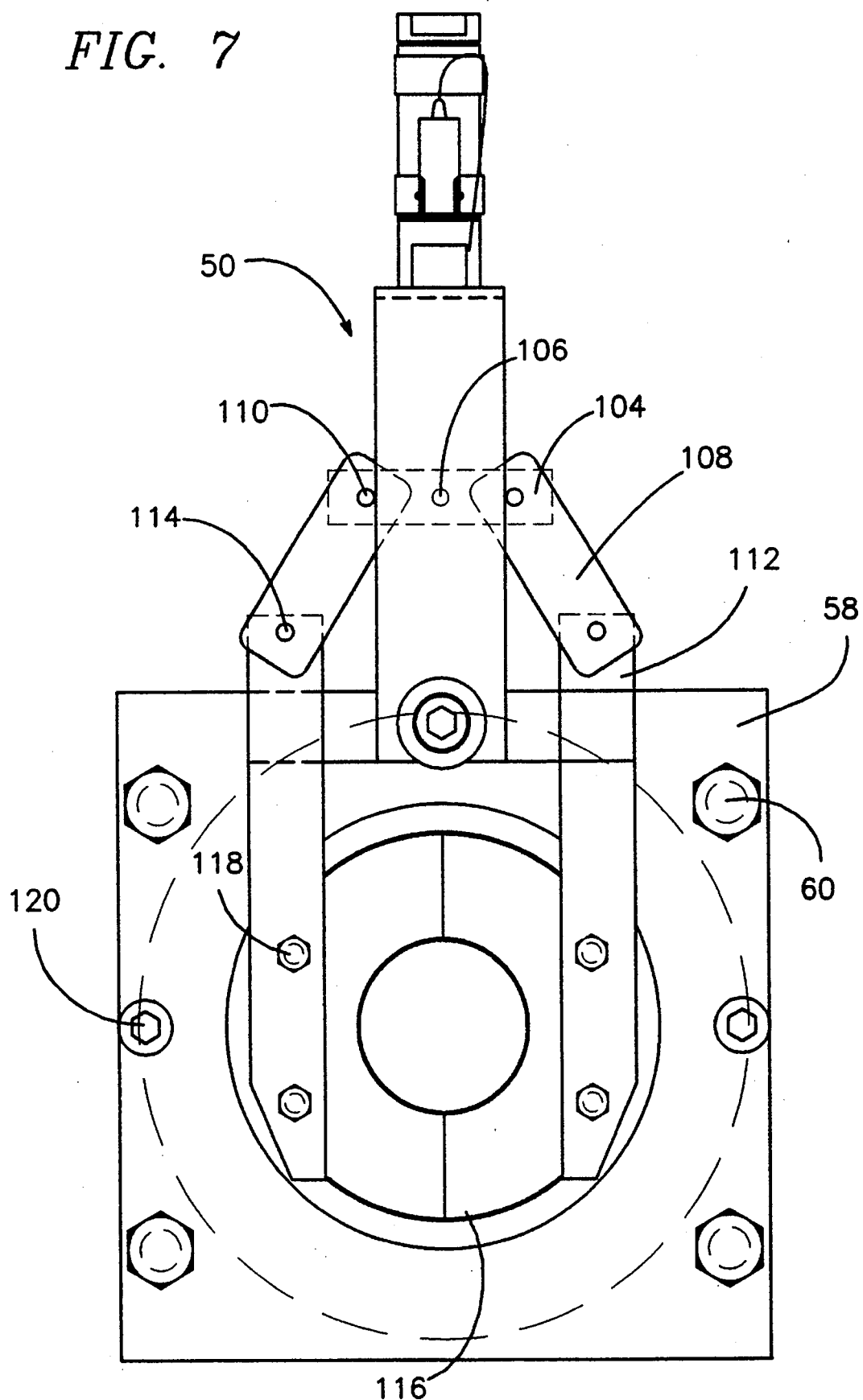
FIG. 7 is a front elevation in partial phantom showing the hydraulic cylinder and the pneumatically-actuated plates for retaining the leader pin within the hydraulic cylinder of the clamping assembly of FIG. 4.

Securing the cylinder brackets 90 together is an end plate 96 (FIG. 4). The end plate 96 is provided with a hole through which is oriented a ram 98 of a double acting air cylinder 100 having a one-inch stroke. A nut 102 or similar securement means is used to anchor the air cylinder 100 on the end plate 96. The ram 98 is secured to a top link 104 by means of a clevis pin 106 (FIGS. 4 and 7). As shown in FIG. 7, the top link 104 is secured on either end to pivot links 108 by additional clevis pins 110. Similarly, the pivot links 108 are secured to arms 112 by clevis pins 114. Each arm 112 is secured to an arcuate locking member 116 by hex screws 118. The arcuate locking members 116 are preferably constructed of heat-treated cold rolled steel to allow the arcuate locking members 116 to withstand the abrasion associated with the clamping process. The arcuate locking members 116 are of a thickness slightly smaller than the thickness of the groove 32 in the leader pin 24 (FIGS. 4 and 7). The outer circumference of the arcuate locking members 116 is slightly smaller than that of the cylindrical recess 72 provided in the push plate 68 to allow the arcuate locking members 116 to fit within the cylindrical recess 72 (FIGS. 5 and 7). The inner circumference of the arcuate locking members 116 is similar to the circumference of the leader pin 24 at the groove 32 (FIGS. 4 and 7). Also secured to the cylinder plate 58 are a pair of stop pins 120 (FIG. 7). The stop pins 120 are preferably of a length sufficient to contact the arms 112 of the leader pin locking assembly 50 regardless of the position of the shaft collar 78 along the jaw mounting pin 76 (FIGS. 4 and 6).

To begin the molding process, the long stroke low pressure hydraulic cylinder 36 is actuated to move the second mold section 18 along the slide track 34 and into seated engagement with the first mold section 12 (FIGS. 1 and 2). As the second mold section 18 is moved toward the first mold section 12, the leader pins 24 secured to the first mold section 12 pass through the second mold section 18 and through the clamping assemblies 30 secured to the second mold section 18. The long stroke low pressure hydraulic cylinder 36 continues to move the second mold section 18 toward the first mold section 12 until the grooves 32 of the leader pins 24 are positioned for engagement with the arcuate locking members 116 of the leader pin locking assemblies 50. The positioning of the arcuate locking members 116 may be adjusted relative to the grooves 32 by changing the position of the lock nuts 84 and 86 along the jaw mounting pins 76 (FIGS. 4 and 6). Since the shaft collar 82 is biased toward the lock nuts 84 and 86 by the compression spring 80, the initial orientation of the shoulder brackets 92 and therefore the arcuate locking members 116 is defined by the positioning of the lock nuts 84 and 86.

Once the leader pins 24 have been properly positioned for engagement with the arcuate locking members 116, the double acting air cylinders 100 are actuated to move the arcuate locking members 116 into engagement with the grooves 32 of the leader pins 24 (FIG. 4). Because the shaft collars 78 are in slidable engagement with the jaw mounting pins 76, the leader pin locking assemblies 50 are free to rotate about the jaw mounting pins 76 (FIGS. 4 and 6). This free rotation provides the leader pin locking assemblies 50 with an automatic alignment attribute which not only assures proper alignment of the arcuate locking members 116 about the leader pins 24, but also prevents damage to the double acting air cylinders 100. If the leader pin locking assembly 50 were not free to rotate, a misalignment of the leader pin locking assembly 50 on the jaw mounting pin 76 would cause one arcuate locking member 116 to contact the leader pin 24 before the other arcuate locking member 116. Damage to the double acting air cylinder 100 could then occur as the double acting air cylinder 100 continues forcing the arcuate locking member 116 into the leader pin 24 in an attempt to bring the arcuate locking members 116 together.

In the present invention the free rotation of the leader pin locking assemblies 50 about the jaw mounting pins 76 avoids this situation. When closing around the grooves 32 of the leader pins 24, the leader pin locking assemblies 50 start with the arms 112 in contact with the stop pins 120. As the double acting air cylinders 100 are actuated, the arms 112 and arcuate locking members 116 move inward toward the leader pins 24. Regardless of which arcuate locking member 116 first contacts the groove 32 of the leader pin 24, the leader pin locking assemblies 50 pivot around the jaw mounting pins 76 to bring the other arcuate locking member 116 into engagement with the leader pins 24.

Once the leader pins 24 have been engaged by the arcuate locking members 116, the hydraulic cylinders 48 are actuated to move the saddles 66 and the push plates 68 toward the arcuate locking members 116 (FIGS. 4 and 5). As the hydraulic cylinders 48 are actuated, the cylindrical recesses 72 of the push plates 68 are moved around the arcuate locking members 116. Once the arcuate locking members 116 have been moved into the cylindrical recesses 72, the retaining walls 74 of the push plates 68 prevent the arcuate locking members 116 from becoming inadvertently detached from the grooves 32 of the leader pins 24 throughout the remainder of the molding process.

After the push plates 68 actually contact the arcuate locking members 116, the hydraulic cylinders 48 begin to push the second mold section 18 away from the arcuate locking members 116 (FIG. 4). As the second mold section 18 begins to move, the jaw mounting pins 76 begin to move relative to the leader pin locking assemblies 50 which compresses the compression springs 80. The compression springs 80 prevent the arcuate locking members 116 from becoming inadvertently dislodged from the recess 72. As the second mold section 18 moves away from the arcuate locking members 116, the second mold section 18 is forced into sealed engagement with the first mold section 12. The hydraulic cylinders 48 brace against the arcuate locking members 116 and the heads 28 of the leader pins 24 to force the second mold section 18 toward the first mold section 12.

While all of the hydraulic cylinders 48 may be set to apply an identical pressure, an advantage of the present plastic injection assembly 10 is its ability to apply localized clamping pressures based upon the requirements of a particular molding operation. In prior art molding assemblies, the clamping unit must apply sufficient pressure to assure no injection material leaks from any portion of the mold unit. Although some portions of the mold unit require less clamping force than others, the prior art clamping units cannot distribute clamping force based upon where such clamping force is needed. Accordingly, the prior art clamping units must apply the maximum required force to the entire mold unit. Not only does this waste energy applying large amounts of force to portions of the mold unit that may be securely clamped with much less force, but the application of this larger amount of force prematurely wears the mold unit. In the present invention each hydraulic cylinder 48 may be set to apply only the minimum required three for that particular portion of the plastic injection assembly 10. By varying the force applied across the plastic injection assembly 10 wear on the mold sections 12 and 18 is reduced and energy savings are realized.

Furthermore, the use of multiple hydraulic cylinders 48 allows very large articles to be efficiently molded. The present apparatus provides an even clamping force throughout the molding process without the need for an immense single clamp unit. The present invention eliminates both the bulkiness and expense normally associated with prior art large clamp units. The use of a plurality of relatively small hydraulic cylinders 48 not only reduces the cost of producing very large clamps and related accessories, but also makes the present plastic injection assembly 10 smaller and easier to move and manipulate.

Once the first mold section 12 and second mold section 18 have been clamped into sealed engagement, a plastic material is injected into the mold cavity 40 through the injection inlet 42 (FIG. 2). The engagement must remain secure throughout the injection process to prevent injection material from escaping along the parting line between the first mold section 12 and the second mold section 18. After the molding process has been completed, the clamping procedure is reversed to open the plastic injection assembly 10 and remove the finished molded part.

Once the molding process has been completed, the hydraulic cylinders 48 are retracted a sufficient distance to draw the push plates 68 away from the arcuate locking members 116 (FIG. 4). Once the retaining walls 74 have cleared the arcuate locking members 116, the double acting air cylinders 100 are actuated to move the arcuate locking members 116 away from the grooves 32 of the leader pins 24 a sufficient distance to clear the heads 28 of the leader pins 24. Preferably, the leader pin locking assemblies 50 are opened until the arms 112 contact the stop pins 120. Again, the slidable securement of the leader pin locking assembly 50 around the jaw mounting pins 76 provides an advantage over a rigid securement. If one of the arcuate locking members 116 were to become stuck in the groove 32 of a leader pin 24, the leader pin locking assembly 50 would simply rotate until the free arm 112 contacted one of the stop pins 120. The leader pin locking assembly 50 could then utilize the bracing of the free arm 112 against the stop pin 120 to force the opposing arcuate locking member 116 out of the groove 32 and into contact with the opposing stop pin 120.

Once the leader pin locking assemblies 50 have been disengaged from the grooves 32 of the leader pins 24, the long stroke low power hydraulic cylinder 36 is used to draw the second mold section 18 away from the first mold section 12 (FIGS. 1 & 4). Once the second mold section 18 has been slid along the slide track 34 a sufficient distance from the first mold section 12, the finished plastic article may be removed from the plastic injection assembly 10 and the molding process repeated.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated that any number and placement of leader pins and hydraulic cylinders may be used to accommodate the specific clamping needs of various molding applications.

What is claimed is:

1. A method for applying clamping pressure to a plastic injection mold unit for molding a plastic article, comprising:

(a) providing a first mold section;

(b) providing a second mold section in mating alignment with said first mold section, said second mold section forming a mold cavity with said first mold section when moved into mating engagement with said first mold section;

(c) securing a leader pin to said first mold section, said leader pin having a groove;

(d) securing a linear actuator to said second mold section;

(e) moving said second mold section into mating engagement with said first mold section to form said mold cavity;

(f) providing a locking mechanism on said leader pin sufficient to prevent inadvertent removal of said leader pin from said second mold section, said locking mechanism comprising: a pivot pin; a sleeve slidably provided on said pivot pin; a supplemental linear actuator operably secured to said sleeve; an arm operably secured to said supplemental linear actuator in a manner which causes said arm to move as said supplemental linear actuator is moved; and a locking plate secured to said arm and being of a sufficient size to fit within said groove of said leader pin;

(g) pushing said leader pin with said linear actuator in a manner which clamps said second mold section into sealed engagement with said first mold section;

(h) releasing said linear actuator;

(i) releasing said locking mechanism from said leader pin;

(j) moving said second mold section away from said first mold section; and (k) securing a push plate to said linear actuator, said push plate being provided with a recess of a size large enough to engage said locking plate and small enough to prevent inadvertent disengagement of said locking plate from said groove of said leader pin when said locking plate is positioned within said recess.

2. A self-contained plastic injection molding apparatus for molding a plastic article comprising:

(a) a first mold section;

(b) second mold section in mating alignment with said first mold section, said second mold section forming a mold cavity with said first mold section when moved into mating engagement with said first mold section, said second mold section being provided with an aperture;

(c) a leader pin secured to said first mold section, said leader pin being of a size capable of passing through said aperture provided in said second mold section;

(d) means for operably locking said leader pin against passage out of said aperture, wherein said locking means is a pair of fluid actuated arcuate locking members capable of engaging said leader pin;

(e) means for pushing said second mold section away from said locking means and into mating engagement with said first mold section; and (f) a push plate secured to said pushing means, said push plate being provided with a recess to receive said pair of fluid actuated arcuate locking members, said recess being provided with dimensions capable of preventing said pair of fluid actuated arcuate locking members from releasing said leader pin when said fluid actuated arcuate locking members are positioned within said recess.

3. A self-contained plastic injection molding apparatus for molding a plastic article comprising:

(a) a first mold section;

(b) a second mold section in mating alignment with said first mold section, said second mold section forming a mold cavity with said first mold section when moved into mating engagement with said first mold section, said second mold section being provided with a plurality of apertures;

(c) a plurality of leader pins secured to said first mold section each provided with a shaft and a head, said plurality of leader pins each being provided with a groove separating said shafts from said heads;

(d) a plurality of longitudinally extensible hydraulic cylinders operably secured to said second mold section over said plurality of apertures, said hydraulic cylinders each being provided with a longitudinal passageways capable of receiving one of said plurality of leader pins;

(e) a plurality of pivot pins operably secured to said second mold section;

(f) a plurality of sleeves slidably provided around said plurality of pivot pins;

(g) a plurality of linear actuators operably secured to said sleeves:

(h) at least two arms operably secured to each of said plurality of linear actuators in a manner in which said arms move relative to one another upon movement of said plurality of linear actuators:

(i) at least two locking plates secured to said at least two arms, said at least two locking plates being of a sufficient size to fit within said groove of said plurality of leader pins in a manner which restricts said plurality of leader pins from undesirable longitudinal movement;

(j) at least two stop pins positioned within sufficient proximity to said at least two arms to allow said at least two arms to simultaneously engage said at least two stop pins; and (k) a plurality of push plates secured to said hydraulic cylinders, said plurality of push plates being provided with recesses of a size large enough to engage said at least two locking plates and small enough to prevent inadvertent disengagement of said at least two locking plates from said groove of said plurality of leader pins when said at least two locking plates are positioned within said recesses.

4. The self-contained plastic injection molding apparatus of claim 3, comprising a plurality of compression springs provided around each of said plurality of pivot pins and in operable engagement with each of said plurality of sleeves.

* * * * *